(12) United States Patent
Lopez

(10) Patent No.: US 10,596,996 B1
(45) Date of Patent: Mar. 24, 2020

(54) VEHICLE BRAKE PEDAL LOCK

(71) Applicant: Ramon Ruben Lopez, Miami, FL (US)

(72) Inventor: Ramon Ruben Lopez, Miami, FL (US)

( * ) Notice: Subject to any disclaimer, the term of this patent is extended or adjusted under 35 U.S.C. 154(b) by 0 days.

(21) Appl. No.: 16/668,160

(22) Filed: Oct. 30, 2019

(51) Int. Cl.
B60R 25/08 (2006.01)
B60R 25/00 (2013.01)

(52) U.S. Cl.
CPC .......... B60R 25/083 (2013.01); B60R 25/005 (2013.01)

(58) Field of Classification Search
CPC .............................. B60R 25/083; B60R 25/005
See application file for complete search history.

(56) References Cited

U.S. PATENT DOCUMENTS

| | | | | |
|---|---|---|---|---|
| 4,471,852 A * | 9/1984 | Schield | .................. | B60R 25/08 180/287 |
| 4,779,435 A * | 10/1988 | Farrow | ............... | B60R 25/0221 70/199 |
| 5,040,387 A * | 8/1991 | Knott, Jr. | .............. | B60R 25/005 70/202 |
| 5,586,457 A * | 12/1996 | Keener | ................. | B60R 25/005 180/287 |
| 5,842,364 A * | 12/1998 | Oliver | ................... | B60R 25/005 70/202 |
| 5,906,121 A * | 5/1999 | Mankarious | .......... | B60R 25/005 70/199 |
| 6,192,724 B1 * | 2/2001 | Vito | ...................... | B60R 25/005 70/202 |
| 6,390,222 B1 * | 5/2002 | Cornelius | ............ | B60R 25/005 180/287 |
| 8,201,655 B1 * | 6/2012 | Haag | ..................... | B60R 25/005 180/287 |
| 9,592,792 B2 * | 3/2017 | Ng | ........................ | B60R 25/006 |
| 2001/0005997 A1 * | 7/2001 | Vito | ...................... | B60R 25/005 70/202 |
| 2002/0088663 A1 * | 7/2002 | Cornelius | ............. | B60R 25/005 180/287 |

* cited by examiner

Primary Examiner — Darlene P Condra
(74) Attorney, Agent, or Firm — Ruben Alcoba, Esq

(57) ABSTRACT

A vehicle brake pedal lock that is fixedly installed under a brake pedal. The brake pedal lock prevents the arm of a brake pedal from being depressed. The brake pedal lock uses a linear servomotor to position a bolt under the brake pedal arm. The linear servomotor is activated using a wired safety switch and a radio frequency remote to minimize inadvertent activation.

4 Claims, 1 Drawing Sheet

VEHICLE BRAKE PEDAL LOCK

BACKGROUND

The present invention is directed to a vehicle brake pedal lock that prevents theft.

The inventor of the present invention has conceived a brake pedal lock that will prevent a brake pedal from being depressed and that will prevent a vehicle from either starting or being driven if somehow started.

The present invention also has a safety feature that will prevent the lock from being inadvertently activated.

Past devices have used hooks that lock around the steering wheel and the arm of a brake pedal to prevent the brake pedal from being depressed. The devices are bulky and need to be applied and removed from the brake pedal when used.

Other brake pedal locks have been used to lock vehicle brake pedals, yet non that have the safety features of the present device nor the convenience of the present device.

For the foregoing reasons there is a need for a vehicle brake pedal lock that is fixed in one location and that has a safety feature that prevents it from being inadvertently activated.

SUMMARY

The present invention is directed to a vehicle brake pedal lock that is fixed in one location and that has safety features that prevents it from being inadvertently activated.

The vehicle brake pedal lock comprises of a base that supports a u-shaped guide that has a pair of legs, the legs of the u-shaped guide are attached to the base. A housing that contains an electronic bolt actuator that is attached to a lateral side of the u-shaped guide. The electronic bolt actuator is either electrically or battery powered and has a bolt that extends and retracts from the electronic bolt actuator. A wired safety switch is connected to the electronic bolt actuator. A radio frequency remote operatively connects to the electronic bolt actuator. A power source powers the electronic bolt actuator. The electronic bolt actuator defines a radio frequency receiver that controls the electronic bolt actuator's actuation.

The device is installed under the arm of a vehicle brake pedal as follows: The base is secured directly under the arm of a brake pedal of a vehicle; the u-shaped guide is secured on the base so that the arm of the brake pedal moves upward or downward within the U-shaped guide; the housing is attached to one of the lateral sides of the U-shaped guide so that the bolt of the electronic bolt actuator, when extended, is positioned directedly under the arm of the brake pedal when the brake pedal is not depressed; the wired safety switch is connected to the electronic bolt actuator; and lastly, a power source is connected the electronic bolt actuator. The power source can be a battery of the vehicle or a battery that is housed within the housing that houses the electronic bolt actuator. The electronic bolt actuator can be any electronic locking mechanism or a linear servomotor.

The radio frequency remote operatively connects to a radio frequency receiver that controls the electronic bolt actuator.

An object of the present invention is to provide a brake pedal lock that is fixed on a vehicle below a brake pedal.

Another object of the present invention is to provide a brake pedal lock that cannot be inadvertently activated.

Yet another object of the present invention is to provide an anti-theft device.

DRAWINGS

These and other features, aspects, and advantages of the present invention will become better understood with regards to the following description, appended claims, and drawings where:

SPECIFICATION

Figure 1:
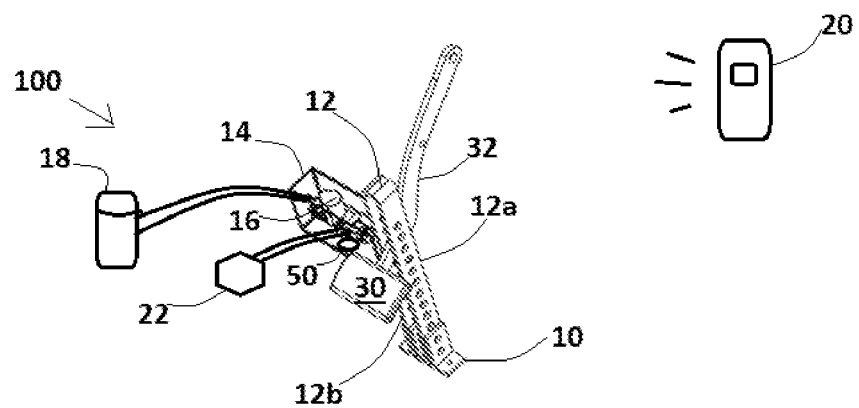
FIG. 1 shows a perspective view of the present invention.
Figure 2:
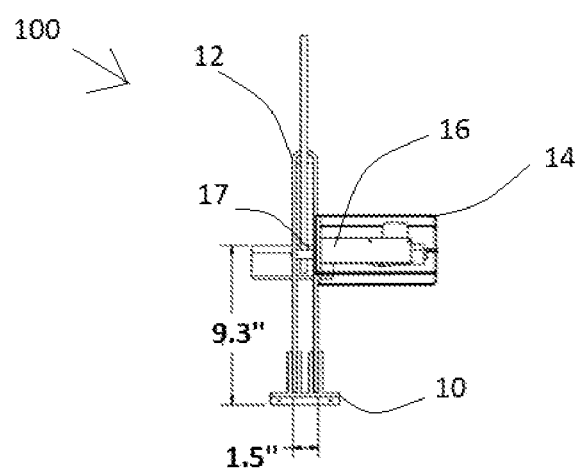
FIG. 2 shows a front view of the present invention.

A seen in FIGS. 1-4, the present invention is a vehicle break pedal lock. The vehicle break pedal lock comprises of a base 10. A u-shaped guide 12 that has a pair of legs 12a, the legs 12a are attached to the base 10. A housing 14 that contains an electronic bolt actuator 16 that is attached to a lateral side 12b of the u-shaped guide 12. A bolt 17 extends and retracts from the electronic bolt actuator 16. A wired safety switch 18 is connected to the electronic bolt actuator 16. A radio frequency remote 20 operatively connects to the electronic bolt actuator 16. And, a power source 22 that powers the electronic bolt actuator 16.

The power source 22 can be either a battery or vehicle battery.

The electronic bolt actuator 16 defines a radio frequency receiver 50 that controls the electronic bolt actuator's actuation.

The vehicle beak pedal lock 100 is installed under the arm 32 of a vehicle brake pedal 30 as follows: The base 10 is secured directly under the arm 32 of a brake pedal 30 of a vehicle; the u-shaped guide 12 is secured on the base 10 so that the arm 32 of the brake pedal 30 moves upward or downward within the U-shaped guide 12; the housing 14 is attached to one of the lateral sides 12b of the U-shaped guide 12 so that the bolt 17 of the electronic bolt actuator 16, when extended, is positioned directedly under the arm 32 of the brake pedal 30 when the brake pedal 30 is not depressed; the wired safety switch 18 is connected to the electronic bolt actuator 16; and lastly, a power source 22 is connected the electronic bolt actuator 16. The power source 22 can be a battery of the vehicle or a battery that is housed within the housing 14 that houses the electronic bolt actuator 16. The electronic bolt actuator 16 can be any electronic locking mechanism or a linear servomotor.

The electronic bolt actuator 16 cannot be activated unless the wired safety switch 18 is turned on and the radio frequency remote 20 is pressed to send the command to either extend or retract the bolt 17.

An advantage of the present invention is that it provides a brake pedal lock that is fixed on a vehicle below a brake pedal.

Another advantage of the present invention is that it provides a brake pedal lock that cannot be inadvertently activated.

Yet another advantage of the present invention is that it provides an anti-theft device.

While the inventor's above description contains many specificities, these should not be construed as limitations on the scope, but rather as an exemplification of several preferred embodiments thereof. Many other variations are possible. Accordingly, the scope should be determined not by the embodiments illustrated, but by the appended claims and their legal equivalents.

What is claimed is:

1. A vehicle brake pedal lock that is placed underneath a vehicle brake pedal, the brake pedal lock comprises:
   a base;
   a u-shaped guide that has a pair of legs, the legs are attached to the base;
   a housing that contains an electronic bolt actuator that is attached to a lateral side of the u-shaped guide, a bolt extends and retracts from the electronic bolt actuator;
   a wired safety switch is connected to the electronic bolt actuator;
   a radio frequency remote operatively connects to the electronic bolt actuator; and
   a power source that powers the electronic bolt actuator.

2. The vehicle brake pedal lock that is placed underneath a vehicle brake pedal of claim 1, wherein the power source is a battery.

3. The vehicle brake pedal lock that is placed underneath a vehicle brake pedal of claim 2, wherein the power source is a vehicle battery that is wired to the electronic bolt actuator.

4. The vehicle brake pedal lock that is placed underneath a vehicle brake pedal of claim 1, wherein the electronic bolt actuator defines a radio frequency receiver that controls the electronic bolt actuator's actuation.

* * * * *